No. 681,615. Patented Aug. 27, 1901.
J. W. BOWERBANK.
LUBRICATING DEVICE.
(Application filed Jan. 17, 1901.)

(No Model.)

WITNESSES:

INVENTOR
John W. Bowerbank
BY
ATTORNEYS

UNITED STATES PATENT OFFICE.

JOHN W. BOWERBANK, OF JERSEY CITY, NEW JERSEY.

LUBRICATING DEVICE.

SPECIFICATION forming part of Letters Patent No. 681,615, dated August 27, 1901.

Application filed January 17, 1901. Serial No. 43,616. (No model.)

*To all whom it may concern:*

Be it known that I, JOHN W. BOWERBANK, a citizen of the United States, and a resident of Jersey City, in the county of Hudson and State of New Jersey, have invented a new and Improved Lubricating Device, of which the following is a full, clear, and exact description.

The object of the invention is to provide a new and improved lubricating device which is simple and durable in construction, very effective in operation, and arranged to permit of using all kinds of lubricants, notably greases that harden when cool, and to economically feed the desired amount of lubricant necessary for proper lubrication only during the time the part to be lubricated is running.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
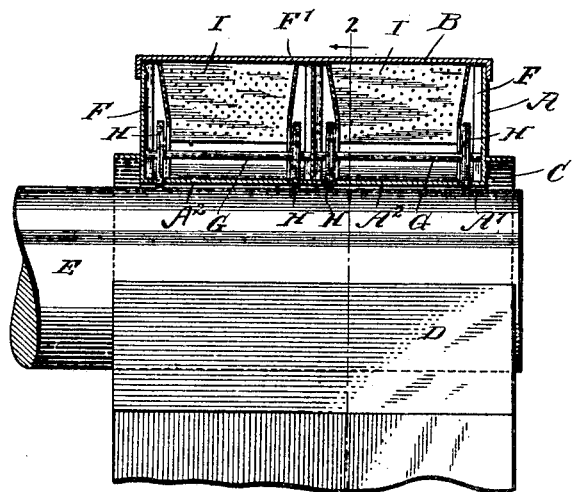
Figure 2:
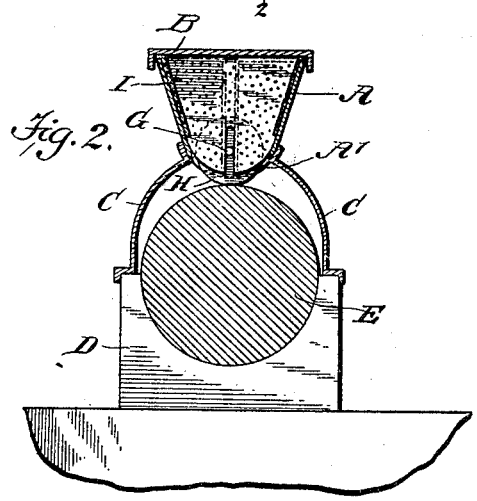
Figure 3:
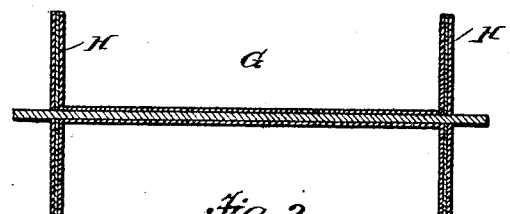

Figure 1 is a longitudinal sectional elevation of the improvement as applied to a journal. Fig. 2 is a transverse section of the same on the line 2 2 in Fig. 1, and Fig. 3 is an enlarged longitudinal sectional elevation of one of the roller-disks.

The improved lubricating device consists, essentially, of a receptacle A, adapted to contain the lubricant and provided at its upper end with a cover B and at its lower end with segmental flanges C, adapted to rest on a bearing D for the journal E to be lubricated. In the ends of the receptacle A are arranged vertically-disposed bearings F, and similar bearings F' are located at the middle of the receptacle A, and in said bearings are journaled the ends of shafts G, each carrying a plurality of disk rollers H, extending within the receptacle A and through slots A', formed transversely in the concave bottom $A^2$ of the receptacle A. A perforate hopper I is set in the upper portion of the receptacle A over each shaft G, the ends of the hopper being between the disk rollers H and the lower end of the hopper being above the shaft G, as is plainly indicated in Fig. 1.

The grease or other lubricant is placed in the hoppers I, and when the journal E is rotating then the heat emanating therefrom causes the grease in the hoppers I to melt and flow upon the bottom $A^2$ of the receptacle and upon the faces of the disk rollers H, so that the latter carry the liquid lubricant upon the peripheral surface of the journal E as the said roller-disks and their shafts are rotated by the rotating journal E. Now it is evident that when the hoppers I are filled with grease and the journal E is not running then the grease hardens, and consequently is held in the hoppers and the bottom of the receptacle without danger of flowing to the roller-disks and the transverse slots A' down upon the journal.

As illustrated in Figs. 1 and 2, the ends of the perforate hoppers are extended and rest on the bottom $A^2$ of the receptacle, the projecting portions of the ends being slotted for the passage of the ends G. By the arrangement described the perforate hoppers are supported within the casing without further supporting devices or fastening means.

As shown in Fig. 3, each of the roller-disks H is preferably made of a number of disks fastened together, the disks being of different material—that is, the outer disks being preferably of a softer material than the middle disk extending between the outer disks. For instance, the outer disks are preferably made of copper, while the middle disk is made of steel, and in a similar manner the shaft G has a central core of steel and a sleeve of copper extending from one disk roller to the other, as indicated in Fig. 3. By the arrangement described the heat of the journal E is quickly transmitted by the roller-disks and its shaft to the lubricant, so that the latter quickly melts when the journal E is running.

It is understood that the bearings F F' are so arranged that the roller-disks rest by their own weights on the peripheral surface of the journal E—that is, the ends of the shafts are free to move up or down in said bearings—but the latter hold the shafts against transverse movement.

Having thus fully described my invention, I claim as new and desire to secure by Letters Patent—

1. A lubricator, comprising a receptacle for containing a lubricant, and provided in its bottom with a transverse slot, and a roller-disk loosely journaled in said receptacle and extending through said slot to engage the peripheral surface of the part to be lubricated, substantially as shown and described.

2. A lubricator, comprising a receptacle for containing a lubricant and having transverse slots in its bottom, roller-disks extending through said slots to contact with the periphery of the part to be lubricated, and bearings in the receptacle for said roller-disks, to allow the latter to rest by their own weight on the part to be lubricated, and to hold the roller-disk against transverse movement, as set forth.

3. A lubricator, comprising a receptacle having a concave bottom with transverse slots, roller-disks extending through the slots to contact with the part to be lubricated, a shaft connecting the roller-disks with each other, and bearings in the receptacle for said shaft, as set forth.

4. A lubricator, comprising a receptacle having a concave bottom with transverse slots, a perforate hopper set in said receptacle, roller-disks extending through said slots, a shaft connecting the roller-disks with each other, and bearings in the receptacle for the shaft to turn in, the part of the shaft extending between the roller-disks being below the lower ends of said perforate hopper, as set forth.

5. A lubricator having a receptacle for containing a lubricant, and provided with transverse slots in its bottom, roller-disks extending through the slots, to contact with the part to be lubricated, and a shaft connecting the roller-disks with each other, said roller-disks and shaft being made of different metals, as set forth.

In testimony whereof I have signed my name to this specification in the presence of two subscribing witnesses.

JOHN W. BOWERBANK.

Witnesses:
THEO. G. HOSTER,
EVERARD BOLTON MARSHALL.